Patented Oct. 19, 1943

2,332,415

UNITED STATES PATENT OFFICE 2,332,415

CHROMIUM RECOVERY

Marvin J. Udy, Niagara Falls, N. Y.

No Drawing. Application August 15, 1940,
Serial No. 352,745

6 Claims. (Cl. 75—84)

This invention relates to the utilization of chromium and chromium compounds and has for an object the provision of certain improvements in processes for utilizing chromium compounds. A particular object of the invention is to provide certain improvements in processes for utilizing chromate compounds.

The invention also contemplates the production of improved chromium-bearing materials and improved composite reagents for use in producing ferrochromium and for use in incorporating chromium in iron and steel. The invention further contemplates the provision of composite reagents of various compositions suitable for effective and efficient use in operations characterized as to type by performance in electric furnaces, combustion furnaces, foundry ladles, crucibles and other types of equipment.

The invention, in one of its aspects, involves the treatment by oxidation of altered chromium-bearing material in which chromic oxide ($Cr_2O_3$) contained therein is so associated with one or more basic compounds as to facilitate oxidation of the chromic oxide to chromium trioxide ($CrO_3$) and combination of the chromium trioxide thus produced with the one or more basic compounds to form one or more chromates. Alteration of crude chromium-bearing material may be effected by subjecting the material to a fusion treatment in the presence of one or more basic compounds such, for example, as lime (CaO) and magnesia (MgO). Oxidation may be carried out under any suitable conditions and in the presence of any suitable basic compound capable of combining with chromium trioxide produced in the oxidation treatment. The products of the oxidation treatments may be employed directly for various uses, as, for example, in the production of chromium-bearing alloys, or, the products of the oxidation treatments may be treated for the recovery of relatively pure chromate compounds (in the form of normal chromates or in the form of bi-chromates, for example), and the relatively pure chromate compounds may be employed in metallurgical operations involving the production of chromium-bearing alloys. Recovery of the chromate compounds from the associated materials may be accomplished in any suitable manner.

By fusing chromium-bearing materials containing minerals of the spinel type and thereafter subjecting the product of the fusion treatment to a concentration treatment in accordance with the invention, I obtain concentrates comprising altered spinel type minerals which altered minerals contain chromic oxide in greater proportions by weight and chromium and iron in higher ratios of chromium to iron than the spinel type minerals of the original chromium-bearing materials. The altered mineral products of my invention may be sufficiently free of ferrous oxide and alumina to approximate true magnesium chromite in composition or they may contain ferrous oxide and alumina in controlled relatively small amounts. In practicing my invention in one of its preferred forms, I prefer to form and recover altered mineral concentrates containing not less than about fifty percent (50%) by weight of chromic oxide and chromium and iron in proportions to give a ratio of chromium to iron above three to one (3:1). I have produced altered mineral concentrates containing more than sixty percent (60%) and even as high as seventy-eight percent (78%) chromic oxide by weight. All concentrates contained iron and alumina in proportions relatively to chromic oxide lower than contained in the spinel type minerals of the original chromium-bearing materials. Chromite ores constitute the principal raw materials from which chromium is recovered, and, therefore, the invention will be described hereinafter more particularly with reference to the treatment of such ores for the recovery of the altered mineral products and concentrates of the invention.

The concentrates are particularly well adapted for use in the economical production of relatively pure chromium compounds which may be used advantageously in the production of alloys containing chromium and other metals as, for example, in the production of chromium-bearing iron and steel products. The invention is capable of producing concentrates free of carbon and such concentrates may be employed to great advantage in the production of ferrochromium and chromium-bearing iron and steel products. In producing the composite reagents of my invention, which reagents are particularly well adapted for use in producing ferrochromium and in producing chromium-bearing iron and steel products, I preferably employ concentrates obtained from the products of fusion treatments to produce relatively pure chromium compounds, but I may employ relatively pure chromium compounds from any source.

The composite reagents of my invention preferably comprise mixtures containing relatively pure chromium compounds and one or more solid, non-carbonaceous reducing agents such, for example, as calcium, aluminum or silicon or an alloy of calcium aluminum or silicon with one or more other elements: for example, calcium silicide, ferrosilicon, ferrochrome silicon, aluminum silicide or ferroaluminum silicon. The chromium compounds and the non-carbonaceous reducing agent preferably are finely divided and intimately mixed. The degree of sub-division and intimacy of mixing in any case will depend to some extent at least on the particular manner in which the composite reagent is to be used. When the heat developed as the result of reaction between the components of a composite reagent is to be relied upon largely or entirely for promoting and continuing the reaction and for melting the reaction products, the degree of sub-division and intimacy of mixing of the components preferably are such that every particle of reducible material contained in the mixture is in direct and substantially complete contact with particles of reducing agent. I have found that such intimate contact requires a degree of comminution such that a large proportion of the chromium-bearing material and the reducing agent consists of particles sufficiently small to pass a 100-mesh screen (Tyler series) and grinding of the materials in contact, or together. When substantial amounts of heat are available, as, for example, when the composite reagents are to be treated in electric furnaces, the components need not be so finely divided and mixing need not be so intimate.

Any suitable relatively pure compound which can be derived or obtained from the oxidized products produced in accordance with the invention may be employed in producing composite reagents. Such compounds include, for example, chromates, bichromates and chromites of alkali and alkaline earth metals, and these products may be employed alone or in various combinations or mixtures containing two or more, and, when used alone or in various combinations or mixtures of two or more, they may be mixed with chromium-bearing materials of any desired degrees of purity derived from other sources. Suitable mixtures may comprise, for example, chromates and chromites proportioned properly for desirable heat control. The chromite proportion of such a mixture, or any part of it, may be obtained by heating a chromate produced in accordance with the invention, or derived from any other source, at a temperature sufficiently high to liberate or drive off a portion of its oxygen content. The chromate proportion, or any part of it, may be provided or obtained by controlling the oxygen liberation to retain a portion of the chromate in unaltered form, or chromite and chromate from separate lots or sources may be mixed in desired proportions. The altered mineral concentrates provide another desirable source of chromite for admixture with chromate. For high temperature operations, the concentrates may be employed in unaltered forms. For low temperature operations, I prefer to convert the magnesium chromite of the concentrates to calcium chromite by heating with lime, as reduction of the chromium of magnesium chromite spinels is very difficult except at high temperatures.

I prefer to employ chromite and chromate compounds of calcium when employing silicon-containing reducing agents in order to provide available lime (calcium oxide, CaO) for fluxing silica ($SiO_2$) produced.

The composite reagents of the invention and smelting charges of the invention employing the oxidized products directly, preferably are free or substantially free, of water in any form. The chromate and chromite compounds employed preferably are anhydrous. Water in any form interferes with the smoothness of reactions and requires the generation of additional heat for its elimination with consequent loss in efficiency. I have found that amounts of water in excess of five-tenths of one percent (0.5%) by weight in the composite reagents and smelting charges are particularly undesirable, and, therefore, I prefer to employ composite reagents and smelting charges containing substantially lower amounts of water.

In preferred composite reagents of the invention, the reducible materials and the reducing agents are so proportioned and so mixed that the mixtures will react exothermically within themselves, in the particular environments in which they are employed, to produce readily separable molten metal and slag phases or products. Desirably, for purposes of economy, little or no reducing agent beyond the exact amount required to accomplish a result sought is employed in any case.

The novel chromite products and the novel chromite-chromate mixtures of the invention may be employed in reaction and smelting charges of any suitable compositions, in any suitable particle sizes and mixed with other components in any suitable degree of intimacy, and they may be employed for any non-metallurgical or other purpose for which they may be suitable.

Smelting charges comprising the products resulting from oxidation of the products of the fusion treatments may include any suitable reducing agent, but they preferably include a non-carbonaceous reducing agent such as ferrochrome silicon. Such charges preferably are smelted in electric furnaces, because they may contain substantial amounts of magnesium chromite spinel from which chromium is difficultly reducible except at high temperatures. They may be smelted in combustion furnaces, of the open hearth type for example, when relatively low recoveries of chromium are satisfactory or when prior treatments have resulted in the breaking down of the magnesium spinel or conversion of the magnesium spinel to a less refractory mineral or compound. Oxidation of the products of the fusion treatments accomplishes the two-fold purpose of conversion of chromite to chromate and elimination of carbon with which the product might have become contaminated in a preceding operation as, for example, in a fusion operation employing carbon or a carbonaceous reducing agent for fractional or preferential reduction of the iron of displaced ferrous oxide. Products of fusion treatments which are contaminated with carbon may be subjected to oxidation treatments primarily to effect carbon removal and the resulting carbon-free or substantially carbon-free material may be employed to produce ferrochromium or chromium iron and steel products by reduction with a non-carbonaceous reducing agent such as ferrosilicon or ferrochrome silicon. Oxidation to effect carbon removal preferably is conducted at temperatures above 1200° C. and below the fusing temperature of the material, and, if chromate formation is desired the material may be maintained subsequently at a temperature below 1200° C. and preferably slightly below 1000° C. for a period of time sufficiently long to permit the desired degree of conversion to chromate.

Depending upon the conditions under which the various composite reagents are to be employed, they may contain additional oxygen containing substances to provide additional heat for melting metal and slag produced. Usually, no additional oxidizing agent will be required, but, if necessary or desirable, any of the common oxidizing agents such, for example, as sodium nitrate, sodium chlorate and manganese dioxide may be employed for promoting oxidation of silicon or other reducing agent with the resultant production of additional heat. Such oxidizing agents are required, for example, when the reaction mixtures contain large amounts of inert materials such as slag-forming materials, and they are employed in amounts (together with the necessary reducing agent) sufficient to produce enough heat to melt the metal and slag produced and give the slag the desired fluidity. The addition of such oxidizing agents requires additional silicon, when silicon is employed for reduction, and the total amounts of silicon and available oxygen are so proportioned as to provide about the theoretical amount of silicon for combining with the available oxygen. If excess silicon is used, the excess will enter the metal produced, control of this being effected in the use of reducible materials and high lime slags.

I may treat the products of the fusion treatments and the concentrates by any method known to the art of chromate production in order to effect oxidation of the chromium, and I may recover the oxidized chromium by any method known to the art of chromium recovery. The oxidized chromium may be recovered, for example (either as an intermediate product or as a final product), as chromite, chromate or bichromate of any suitable composition. When I desire to prepare composite reagents for use in producing alloys containing chromium, I may first produce chromate or bichromate or a mixture of chromate and bichromate and, thereafter, heat the product to eliminate all or a portion of its oxygen content with the production of chromite or a mixture of chromite and chromate, as hereinbefore explained.

The concentrate products may be treated similarly to the direct products of the fusion treatments for the production and recovery of chromates. In a preferred process of the invention, I roast the concentrate products with lime sufficient to form calcium chromate with all of the chromium present and thus convert substantially all of the chromium to calcium chromate. In effecting such a conversion, I prefer to roast the concentrate in air in the form of a finely divided admixture with lime (or lime and a small amount of soda ash) at a temperature below 1000° C. and above 750° C. to convert the magnesium chromite to calcium chromate. A product thus formed constitutes a highly suitable reagent for use in forming exothermic mixtures to be used in the production of alloys containing chromium without treatment for the recovery of a relatively pure chromate compound, as it may be virtually or largely free of gangue materials, and the chromium, combined as it is with calcium, is readily reducible at relatively low temperatures. Such a calcium chromate product contains an excess of oxygen over that required to oxidize the amount of silicon or other non-carbonaceous reducing agent necessary for the development of sufficient heat to melt the reaction products in exothermic mixtures containing sufficient reducing agent to reduce all of the chromium to the metallic state, and, under the circumstances, the use of the product directly in exothermic mixtures would involve wasting of reducing agent.

Therefore, in employing the calcium chromate product, I prefer to subject it to a preliminary heat treatment to eliminate that portion of the oxygen which may be unnecessary for desirable exothermic reaction. For most purposes, elimination of about forty to seventy percent (40 to 70%) of the available oxygen produces satisfactory products consisting essentially of calcium chromite and calcium chromate contaminated with the small amounts of gangue materials associated with the concentrates roasted initially. Oxygen can be eliminated to the desired extent by heating the calcium chromate product in the solid state under controlled conditions to temperatures above about 1200° C.

Following is a specific example of a process of my invention illustrating a fusion treatment in which a molten fused product is formed, with fractional reduction of iron, and the non-metallic product of the fusion treatment is employed for chromate production:

Using an ore of the following analysis:

| | Per cent |
|---|---|
| $Cr_2O_3$ | 44.00 |
| FeO | 23.60 |
| $Al_2O_3$ | 13.80 |
| $SiO_2$ | 6.20 |
| MgO | 8.30 |
| CaO | 3.02 |

I first smelt in a submerged arc furnace a charge comprising 1000 pounds of ore, 184 pounds of lime (CaO), 50 pounds of coke and 100 pounds of silica. The products resulting from this smelting operation are a metal high in iron and low in chromium, which is a by-product, and an altered ore product high in chromium and low in iron and which disintegrates to a fine powder.

The analysis of the altered ore product resulting from smelting the above charge, and after screening over a 60-mesh screen, was as follows (screening removes raw ore, metal and coarse particles):

| | Per cent |
|---|---|
| $Cr_2O_3$ | 39.20 |
| FeO | 3.98 |
| $SiO_2$ | 15.65 |
| $Al_2O_3$ | 13.40 |
| CaO | 19.80 |
| MgO | 8.05 |

The screen analysis was as follows:

| | Per cent |
|---|---|
| −60 mesh+80 mesh | 27.6 |
| −80 mesh+100 mesh | 21.4 |
| −100 mesh+150 mesh | 24.1 |
| −150 mesh+200 mesh | 17.9 |
| −200 mesh | 9.0 |

This material is very fine and grinds with ease to minus 200 mesh, which particle size I prefer for making chromates. I may mix 100 parts of this altered ore product with 39 parts of lime and 26.3 parts of sodium carbonate, grind the mixture and roast the ground product with access of air at 900° C. to 1000° C. for from three-quarters of an hour to one hour in a rotary kiln or muffle furnace. With the material of the above screen analysis the conversion of the chromium to chromate is about 90%. If somewhat longer time is used for roasting, or if the amount of lime or soda ash used is increased slightly, the soluble chromate will reach 95% with ease. If the material is ground to pass 200 mesh, the conversion may be as high as 96.5% in three-quarters of an hour to one hour at 900° C. to 1000° C. It will be noted that the amount of soda ash employed is only 50% of that required to form sodium chromate with all chromium present. The remainder of the chromium appears as calcium and magnesium chromates.

The roasted product may be lixiviated in the usual manner, filtered, acidified with sulphuric acid to form calcium sulphate which may be removed by filtration, the liquor then evaporated and the sodium bichromate crystallized. Or a mixture of calcium chromate ($CaCrO_4$) and sodium chromate ($Na_2CrO_4$) may be crystallized and dehydrated.

It is not necessary to use only 50% of the required soda ash. The full amount required to form sodium chromate with the chromium present may be used, and it will reduce the roasting time to some extent. However, the roasting time is reduced with only 50% of the soda ash to almost a practical minimum. More soda ash than 50% has the effect of softening the mix and requiring more lime to facilitate complete oxidation. If a chromate product consisting largely of calcium chromate is desired, soda ash will be used only in small amounts to serve as catalyst and the lime employed will be increased accordingly.

The following example illustrates the use of concentrates produced in accordance with my invention to make chromates of calcium or sodium or both:

Using a concentrate made as above described and having the following analysis:

| | Per cent |
|---|---|
| $Cr_2O_3$ | 68.3 |
| FeO | 7.3 |
| $Al_2O_3$ | 11.0 |
| CaO | 1.9 |
| MgO | 11.5 |

I mix 100 parts of concentrate with 53 parts of lime (CaO) (approximately 10% excess for two molecules of CaO to one molecule of $Cr_2O_3$) and 5 parts of soda ash (soda ash may vary up to 50% of that required to make sodium chromate, ($Na_2CrO_4$) but for calcium chromate ($CaCrO_4$) it should be kept at a reasonable minimum) grind to minus 100-mesh or finer and roast in a rotary kiln or other suitable furnace in an oxidizing atmosphere at a temperature of about 700° C. to 1000° C. The most rapid oxidation takes place at about 900° C. to 1000° C. and the chromic oxide ($Cr_2O_3$) is converted to chromate in from one-half hour to one hour. About 96% or more will be converted to chromate in this period of time at a temperature of about 1000° C. and under proper oxidizing conditions such as are attained in a rotary kiln. After the conversion to chromate is complete, the calcium chromate is recovered by known means such as dissolving in a slightly acid solution to give a solution of calcium bichromate from which calcium chromate or bichromate may be crystallized or otherwise recovered. The calcium bichromate or chromate may be converted to the corresponding chromates of sodium or potassium by treatment with corresponding carbonates or hydroxides of sodium or potassium and crystallizing in the usual manner.

One of the important objects accomplished by this process is the production of calcium chromate direct, thus making it cheap enough to be used as a source of chromium in metallurgical work for producing chromium metal and chromium-bearing steels. For producing chromium-bearing steels, I prefer to use the dehydrated calcium chromate as an oxidant in exothermic mixtures containing non-carbonaceous reducing agents such as silicon and silicon-containing alloys.

In the production of composite reagents for use in making steel and employing calcium chromate ($CaCrO_4$) from any source as a source of chromium, provision should be made for controlling temperatures which may be developed as a result of the exothermic reactions to insure the development of temperatures suitable for the particular operations in which the reagents are to be employed. Temperature control may be accomplished, for example, by controlling the total amount of available oxygen in a composite reagent or by diluting the composite reagent with a material which will absorb excess heat produced in the exothermic reaction, or, temperature control may be accomplished by combining available oxygen control with dilution. Reaction of pure calcium chromate with a reducing agent such as silicon, in a composite reagent consisting essentially of calcium chromate and a high-silicon silicon-containing reagent, would produce too much heat for good steel-making, and the silicon cost per pound of chromium recovered would be high. On the other hand, reaction of pure calcium chromate with a reducing agent such as silicon in a composite reagent containing an excess of diluent heat-absorbing material would produce too little heat for good steel-making.

In order to accomplish effective control of heat and temperature development, I may control the amount of available oxygen in a composite reagent through the inclusion of a chromium compound containing chromium in a lower state of oxidation than in calcium chromate, or by the inclusion of a diluent material such as lime or a metal of a type I wish to incorporate in the resulting metal product. In producing composite reagents, I prefer to employ as diluent materials, metal such, for example, as ferrochromium, ferrovanadium, ferrotungsten, ferromanganese, ferromolybdenum, nickel and copper. The excess heat is dissipated in melting the metals, and the silicon employed in developing the excess heat is employed for a useful purpose. If calcium chromate is to be employed as the sole source of chromium in the composite reagent and if no diluent material is to be used, the calcium chromate ($CaCrO_4$) should be broken down preliminarily to form a mixture of calcium chromite ($CaO.Cr_2O_3$) and calcium chromate ($CaCrO_4$). About 50% of the chromium as chromic oxide ($Cr_2O_3$) and 50% as chromium trioxide ($CrO_3$) gives a good mix capable of developing sufficient heat for the reaction and to maintain the temperature of the steel bath. Various other proportions of chromic oxide and chromium trioxide may be employed advantageously. The proportion of chromium trioxide should be held to the minimum requirement for low silicon costs, low slag volume and high recoveries.

The following example illustrates the use of a composite reagent comprising an intimate mixture of ferrochrome silicon with calcium chromite and calcium chromate present in equal proportions:

To make one ton of 12% chromium steel, I melt down in the ordinary way in an open hearth or electric furnace 1750 pounds of steel scrap and pig iron. The carbon is removed in the usual manner with mill scale or iron ore to a point under .10%. I then add 790 pounds of the finely divided, intimately mixed and dry mixture of calcium chromite, calcium chromate and ferrochrome silicon containing approximately 33.8% chromium. The preliminary slag may be removed if desired or it may be left on the steel bath. Since the reaction producing chromium takes place chiefly within the exothermic mixture itself, it is not necessary to remove the slag in most cases. After the reaction is over, I tap and finish the steel in the ordinary manner. The recovery of the chromium is about 90% and the steel analyzes approximately 12% chromium and less than .10% carbon. The slag volume is about 400 to 600 pounds per ton of steel, depending upon pick-up from furnace lining.

I may modify the above procedure with equal and in some cases improved results by simply placing the exothermic mixture into the ladle and tapping the molten steel on to the mix. The reaction is rapid and well completed by the time the furnace is tapped.

The slag may be made as basic or acid as desired. In the above case the ratio of lime to silica in the slag is 1.17 CaO to 1 $SiO_2$. This type of slag gives good results but it may be more acid or more basic, depending on the type of furnace lining used, the result desired and the technical procedure followed.

Certain features of the disclosure of this application not claimed herein are disclosed and claimed in my copending applications Serial No. 244,697, filed December 8, 1938, issued as Patent No. 2,256,536, and Serial No. 252,743, filed January 25, 1939.

I claim:

1. A composite reagent suitable for use in the production of chromium alloys in the form of an intimate mixture consisting of (1) a solid, finely divided product containing chromite formed by heating a chromate to liberate oxygen and (2) a solid, finely divided, non-carbonaceous reducing agent capable of reducing chromium.

2. A composite reagent suitable for use in the production of chromium alloys in the form of an intimate mixture consisting of (1) a solid, finely divided chromate, (2) a solid, finely divided chromite formed by heating a chromate to liberate oxygen and (3) a solid, finely divided non-carbonaceous reducing agent capable of reducing chromium.

3. A composite reagent suitable for use in the production of chromium alloys in the form of a substantially anhydrous intimate mixture consisting of (1) solid, finely divided calcium chromite, (2) solid, finely divided calcium chromate and (3) a solid, finely divided, non-carbonaceous reducing agent capable of reducing chromium.

4. A composite reagent suitable for use in the production of chromium alloys in the form of an intimate mixture consisting of (1) solid, finely divided calcium chromate (2) solid, finely divided calcium chromite formed by heating calcium chromate to liberate oxygen and (3) a solid, finely divided non-carbonaceous reducing agent capable of reducing chromium.

5. The method of producing a reaction mixture suitable for use in the production of chromium alloys which comprises heating calcium chromate to liberate oxygen and forming a mixture comprising calcium chromite and calcium chromate, and intimately mixing the mixture comprising calcium chromite and calcium chromate in solid, finely divided form with a solid, finely divided non-carbonaceous reducing agent capable of reducing chromium.

6. The method of producing a reaction mixture suitable for use in the production of chromium alloys which comprises heating calcium chromate to liberate oxygen and produce calcium chromite, and forming an intimate mixture of solid, finely divided particles comprising the calcium chromite, calcium chromate and a non-carbonaceous reducing agent capable of reducing chromium.

MARVIN J. UDY.